United States Patent [19]

Thinesen

[11] Patent Number: 5,050,141

[45] Date of Patent: Sep. 17, 1991

[54] PROGRAM TO SYNCHRONIZE PACE IN A MULTIMODE ALARM TIMEPIECE

[75] Inventor: Tom Thinesen, Sunnyvale, Calif.

[73] Assignee: Timex Corporation, Middlebury, Conn.

[21] Appl. No.: 559,770

[22] Filed: Jul. 30, 1990

[51] Int. Cl.[5] ........................ G04B 23/02; G04F 8/00; G01C 22/00

[52] U.S. Cl. ...................................... 368/73; 368/109; 368/110; 368/251; 364/565; 364/569; 377/20

[58] Field of Search .............................. 368/10, 72–74, 368/107–113, 250–251; 364/410, 413.02, 561, 569; 340/309.15, 309.4, 384 E; 377/15, 20

[56] References Cited

U.S. PATENT DOCUMENTS

| | | | |
|---|---|---|---|
| 4,220,996 | 9/1980 | Searcy | 364/410 |
| 4,285,041 | 8/1981 | Smith | 364/413.02 |
| 4,337,529 | 6/1982 | Morokawa | 368/10 |
| 4,387,437 | 6/1873 | Lowrey et al. | 364/561 |
| 4,396,904 | 8/1983 | Hanaoka | 368/111 |
| 4,525,074 | 6/1985 | Murakami | 368/10 |
| 4,578,769 | 3/1986 | Frederick | 364/561 |
| 4,632,570 | 12/1986 | Kelsey | 368/107 |
| 4,887,249 | 12/1989 | Thinesen | 368/10 |

OTHER PUBLICATIONS

Casio Model Nos. J-31N-1; J-51W-1B; JP-10-0W-1BV; EXW-50-IAV from "Casio Collection 1990", pp. 5, 6.

47st Photo Ad p. 97, 1990 Catalog—Casio Runners Watch, Model J52W.

*Primary Examiner*—Vit W. Miska

*Attorney, Agent, or Firm*—William C. Crutcher

[57] ABSTRACT

A multimode electronic timepiece has an electroptic display, an alarm, several pushbuttons and an integrated circuit programmed to keep time. Several timepiece operating modes include a pace mode, wherein audible periodic beeping sounds are produced by the alarm which correspond to the value of a preselected pace of an operator. A first manual actuation of a pushbutton commences a timing event, and second manual actuation of the pushbutton terminates the timing event. An internal program alters the preselected pace and stores an altered pace in response to the time elapsed between first and second actuation of the pushbutton. The program displays the altered pace and causes the alarm to beep at a rate equivalent to the altered pace.

17 Claims, 5 Drawing Sheets

PROGRAM TO SYNCHRONIZE PACE IN A MULTIMODE ALARM TIMEPIECE

BACKGROUND OF THE INVENTION

This invention relates generally to multimode electronic timepieces which display and sound walking or running pace with audible alarm devices. More particularly, the invention relates to an improved program for altering a previously selected pace and for performing calculations utilizing the altered pace. Such electronic timepieces are used by runners, walkers, bicyclists, rowers and the like.

Multimode, multifunction wristwatches (or wrist instruments) are known which include a display, an audible alarm device or beeper, a number of manually actuated switches and an integrated circuit programmed in a preselected sequence. Examples of such watches are seen in U.S. Pat. Nos. 4,783,773—Houlihan et al, 4,780,864—Houlihan and U.S. Pat. No. 4,283,784—Horan, all of the foregoing being assigned to the present assignee. In the foregoing patents, which are merely exemplary of multimode electronic wrist instruments or multifunction wristwatches, one of the manual actuators may typically serve to repetitively cycle the instrument through a number of modes or operating states in each of which a different type of information is displayed. Such modes may include, in a multifunction watch, the time of day, chronograph, dual time zone, elapsed time and an alarm setting mode. By special actuation of one of the preselected switches, the wristwatch may be further converted into a computer, a speedometer, pulsometer or any other type of device which will perform calculations and display data, subject only to the imagination of the designer and programmer of the integrated circuit. While in any of these modes, one or more manual switch actuators may be employed to enter information or to perform calculations. One such application, and one to which the present invention applies, is a pace counting watch, which counts and selectively beeps to provide a running pace, a walking pace, a cycling cadence and so forth.

Information from external sources other than the operator may also be entered into the wrist instrument, and if this instrument includes a sensor which is capable of detecting an operating condition said information may be entered automatically, without manipulation by the operator. Calculations involving speed and rate and other time variable information can be performed in order to display useful information by using the time keeping circuit as a clock. For example, in U.S. Pat. No. 4,887,249, issued Dec. 12, 1989 and assigned to the present assignee, a bicycle watch is disclosed which is converted into an odometer or speedometer. One input to the odometer formula is bicycle wheel diameter, which is manually entered by the operator, and another is revolutions per minute (rpm) of the bicycle wheel. The latter (rpm) is detected by a sensor, so that as the operator speeds up or slows down, the rpm information supplied for the calculation is constantly readjusted and so, therefore, is the information displayed.

Pacer or walker watches are known which provide rhythmic beeps, the rate of which is preset by the operator, and which are used to establish a walking or running pace. When this preselected pace or cadence "counting rate" usually expressed in steps per minute is entered together with a preselected "stride" distance, the watch will calculate the distance covered by the walker or runner, his rate of travel, and the remaining distance to be traveled. Thus, the walker or runner must conform this pace to the cadence which he has set ahead of time. However, this preset cadence might not be comfortable, or might vary from the natural cadence of the runner or walker, and therefore he might desire to change this cadence. Although the cadence may be changed, this is a cumbersome process which may require several adjustments and will also likely require the walker or runner to stop in order to reset the cadence.

Accordingly, one object of the present inventions is to provide an improved program which will allow the operator to synchronize the pace which is set in a multimode alarm timepiece with the operator's natural pace.

Another object of the invention is to provide an improved program to perform calculations in multimode timepiece which will permit correction of the pace in accordance with feedback information entered by the operator, revise the calculations using this corrected pace, and then display the results of the revised calculations.

Another object of the invention is to provide an improved program in a multimode timepiece which will allow a runner or walker to alter and synchronize the pace provided by the timepiece in a simple manner while running or walking.

SUMMARY OF THE INVENTION

Briefly stated, the invention comprises an improvement in a multimode electronic timepiece having an electroptic display, an audible device, several manually actuated actuators and a mask programmable integrated circuit programmed to keep time and to provide several timepiece operating modes. The modes include a pace mode, wherein said integrated circuit is programmed to permit an operator to switch between modes in response to actuation of at least a first of said actuators. The integrated circuit is further programmed to accept and store information in memory in response to actuation of at least a second of said actuators, to perform calculations thereon and to display said information and results of said calculations on said electroptic display. The integrated circuit is further programmed to provide, upon actuation of at least a third of said actuators, audible periodic electronic sounds produced by said audible device, wherein the frequency of said sounds varies proportionately to the value of a preselected pace of said operator. The improvement comprises means responsive to first manual actuation of a selected actuator coinciding with one footfall of the operator to commence a timing event, means responsive to second manual actuation of said selected actuator coinciding with a later footfall of the operator to terminate said timing event, program means to alter said preselected pace and store an altered pace which is inversely proportional to the time elapsed between first and second actuation of said selected actuator, and means for displaying said altered pace and causing said audible device to sound at a rate equivalent to said altered pace.

DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

DESCRIPTION OF THE PREFERRED EMBODIMENT

Figure 1:
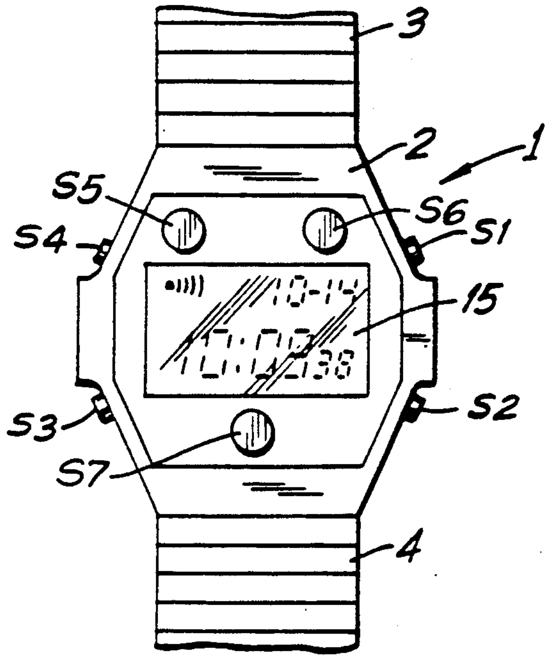
FIG. 1 is a plan view of a multimode electronic wristwatch in simplified form.

Referring now to FIG. 1 of the drawing, a multimode electronic wristwatch 1 includes a case 2 adapted to be held on the wrist by a strap, portions of which are seen at 3 and 4. The wristwatch case includes seven manual pushbutton actuators S1, S2, S3, S4, S5, S6, and S7 arranged to close spring contacts (not shown) inside the watch case 2. An electroptic display 15, which is commonly a liquid crystal display (or LCD) displays digits, letters or other symbols when activated by a microcomputer inside the watch in the form of an integrated circuit.

Figure 2:
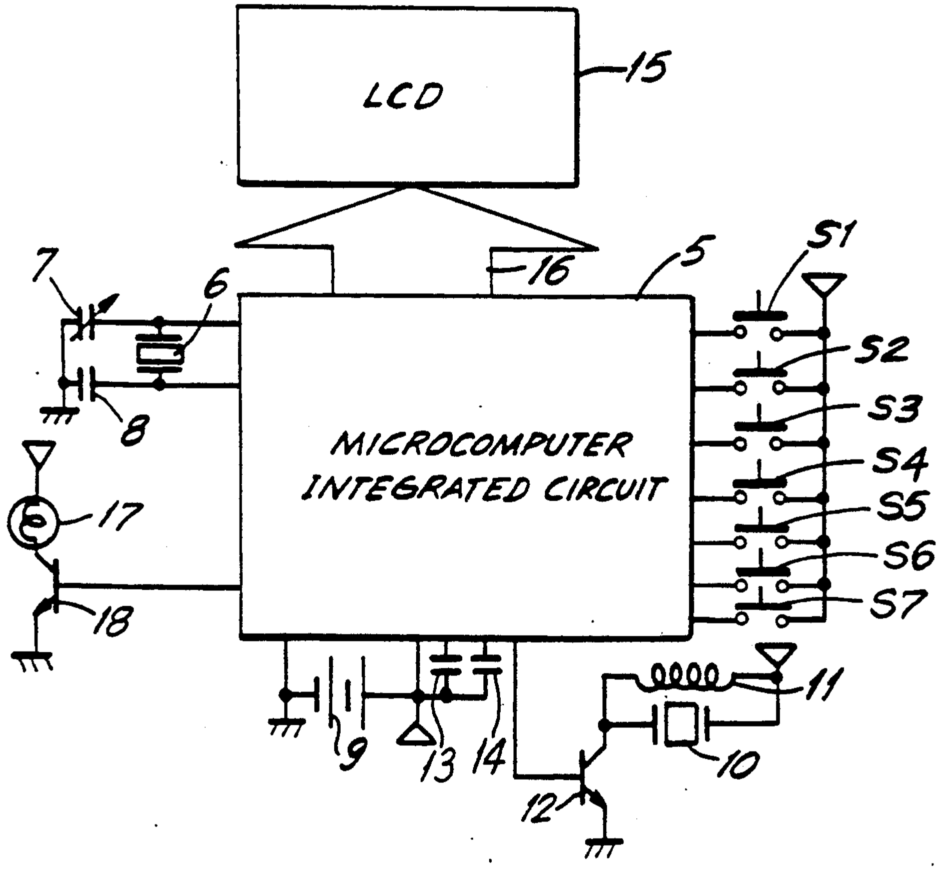
FIG. 2 is a block diagram of a circuit for the wristwatch of FIG. 1, together with external components such as audible device, switches and display.

Referring to FIG. 2 of the drawing, a schematic block diagram of the electrical connections is shown which is in accordance with conventional multimode electronic watch technology well known to those skilled in the art. A programmable microcomputer 5, in the form of a mask-programmable integrated circuit is bonded to a printed circuit board (not shown) and includes suitable pin connections and leads connected to various external components shown in the diagram which are also mounted on the printed circuit board. The microcomputer includes a microprocessor, operating system program for carrying out instructions, and addressable ROM and RAM memory locations. A quartz crystal 6 connected in circuit with capacitors 7 and 8 and connected to the oscillator pins of the integrated circuit 5 provides a high-frequency time base. A battery power source 9 is provided in the form of a button type energy cell in the watch case. An audible sounding device serving as beeper and watch alarm is made up of a piezoelectric crystal 10, inductance coil 11 and drive transistor 12. Two fixed external capacitors 13, 14 combined with other circuit elements inside the integrated circuit 5 serve to boost the output voltage to drive LCD 15 through a display bus 16, which depicts multiple leads connected to the various actuatable segments of the LCD display 15 (also shown in FIG. 1). Display 15 optionally may be arranged in close proximity with, so as to be illuminated by, a lamp 17 when the lamp is lit by a switching signal from integrated circuit 5 applied to the base of switching transistor 18.

The following Table 1 shows a complete list of modes for time-of-day mode (TOD), chronograph mode (CHRONO), elapsed time mode (TIMER), pace mode (PACE) and alarm mode (ALARM). Column 1 identifies the manually actuated switches S1 through S7 and columns 2 through 6 show the action taken when the switch is actuated while in that particular mode. Column 7 (SET) is a setting routine which is entered from selected modes by pressing a selected actuator, S4, as shown in columns 2, 4 and 6 of Table 1. Once in the SET routine, switches S1 through S7 perform the indicated task shown in Column 7. The switch S6 initiates the pace confirmation and pace adjustment program from any of the display modes of columns 2 through 6.

TABLE 1

| Col. 1 SWITCH | Col. 2 T.O.D. | Col. 3 CHRONO | Col. 4 TIMER | Col. 5 PACE | Col. 6 ALARM | Col. 7 SET |
|---|---|---|---|---|---|---|
| S1 | LAMP | LAMP/DIST | LAMP/DIST | LAMP | LAMP | FWD |
| S2 | PEEK ALARM | STOP/RESET | RESET | PEEK T.O.D. | PEEK T.O.D. | REV |
| S3 | MODE TO CHR/TMR | MODE TO PACE | MODE TO PACE | MODE TO ALARM | MODE TO T.O.D. | SELECT |
| S4 | ENTER SET | SELECT LAP/SPLIT | ENTER SET | ENTER CALIB. | ENTER SET | EXIT SET |
| S5 | PULSE CHECK | PULSE CHECK | PULSE CHECK | PULSE CHECK | PULSE CHECK | REV |
| S6 | PACE ADJST. | PACE ADJST. | PACE ADJST. | PACE ADJST. | PACE ADJST. | FWD |
| S7 | PEEK AT CHRONO | START/ LAP/SPLIT | START/ STOP | SELECT PACE MODE | ARM/ DISARM AL/CHI | SELECT |

Figure 3:
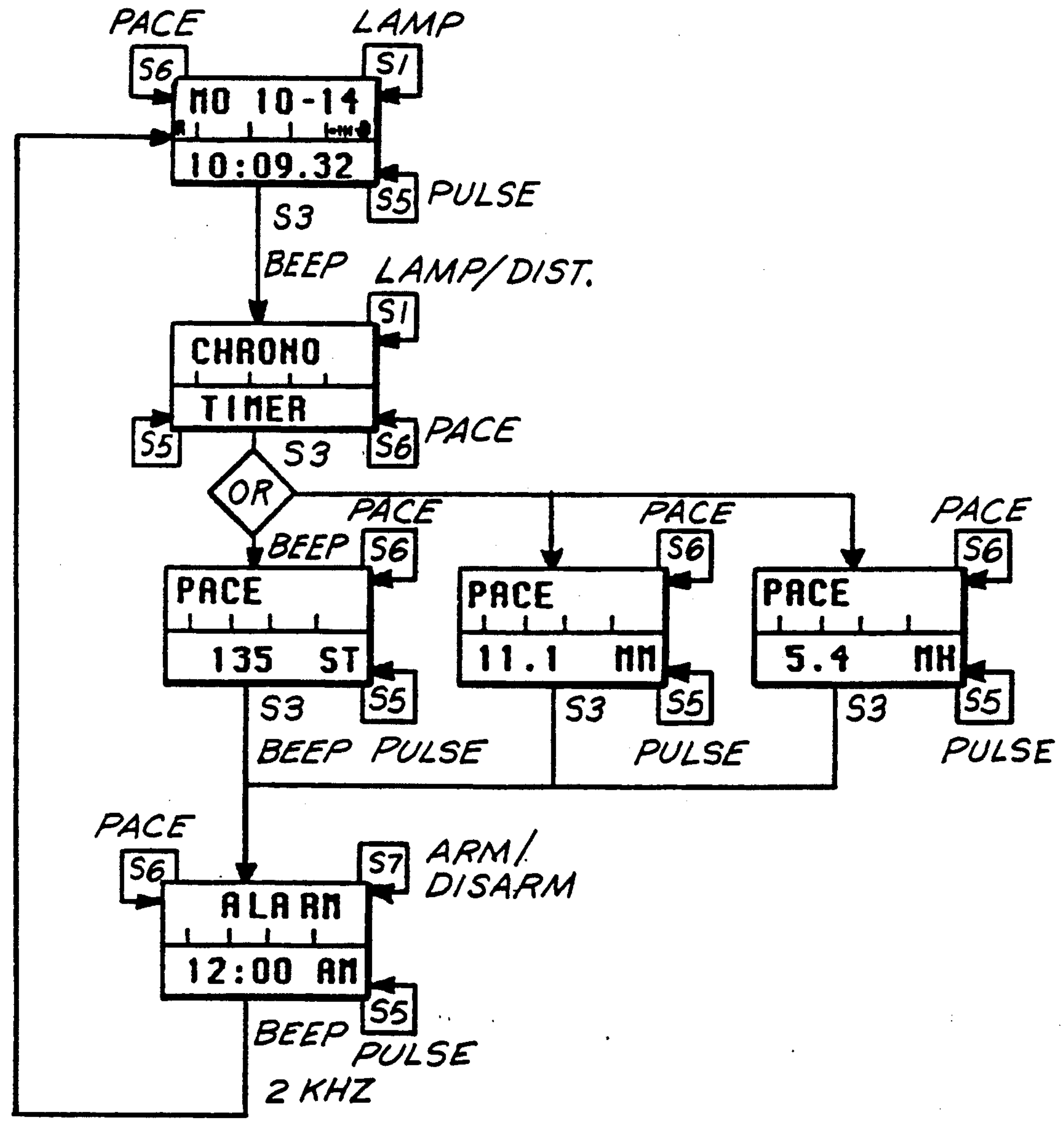
FIG. 3 is a block diagram of a multimode wristwatch illustrating the basic sequence of modes which are displayed in response to manually actuated switches.

Referring now to FIG. 3 of the drawing, a block diagram of a multimode wristwatch illustrates the sequence of modes or states displayed in response to manually actuating switches S1–S7 in accordance with Table 1. Each of the rectangles illustrates the appearance of the display when entering the particular mode illustrated. The decision block labeled "OR" represents optional alternate display choices for the "pace" mode display a will be explained.

Figure 4:
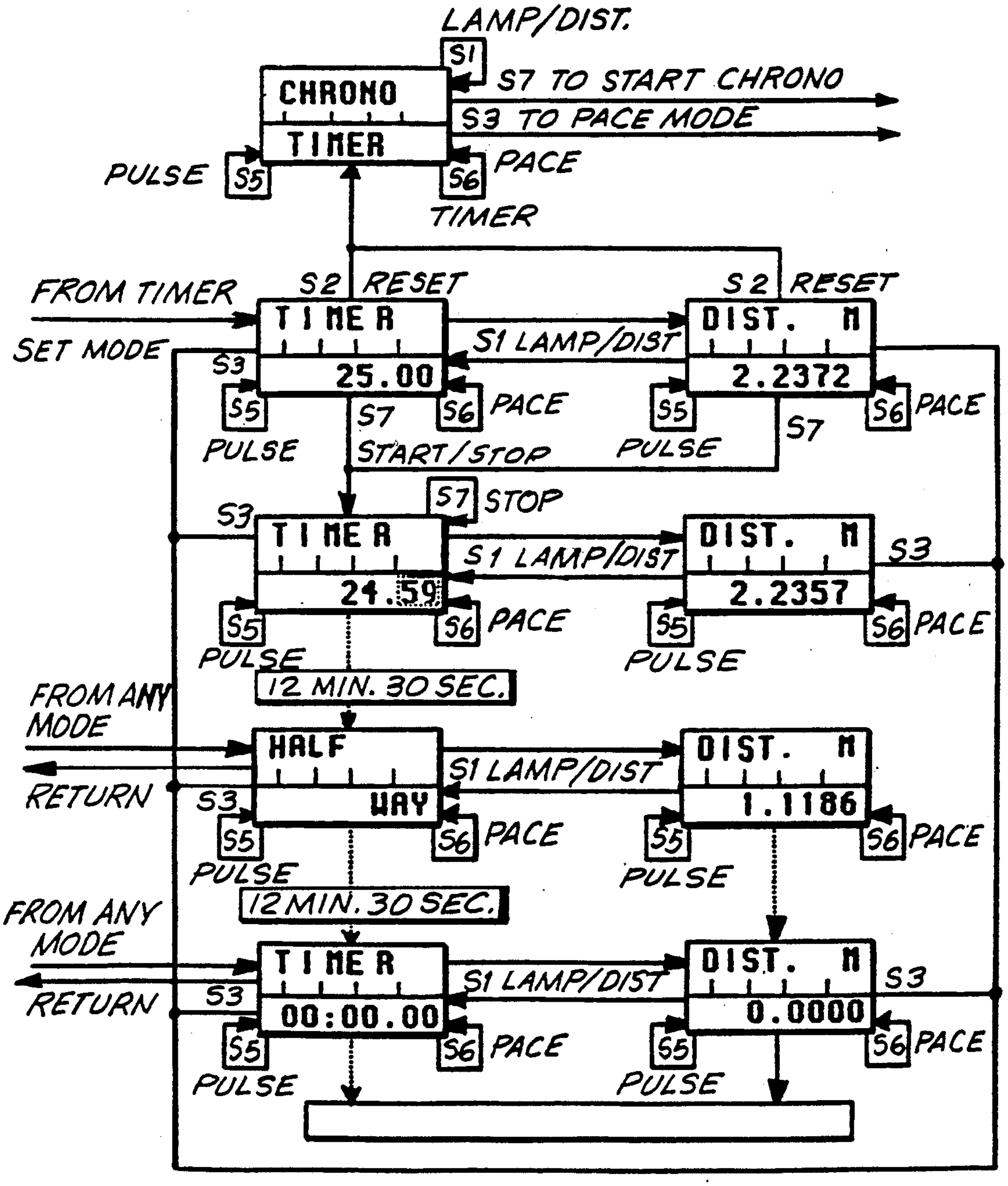
FIG. 4 is a detailed state diagram of an elapsed time mode with means to also display distance to be traveled during this elapsed time.
Figure 5:
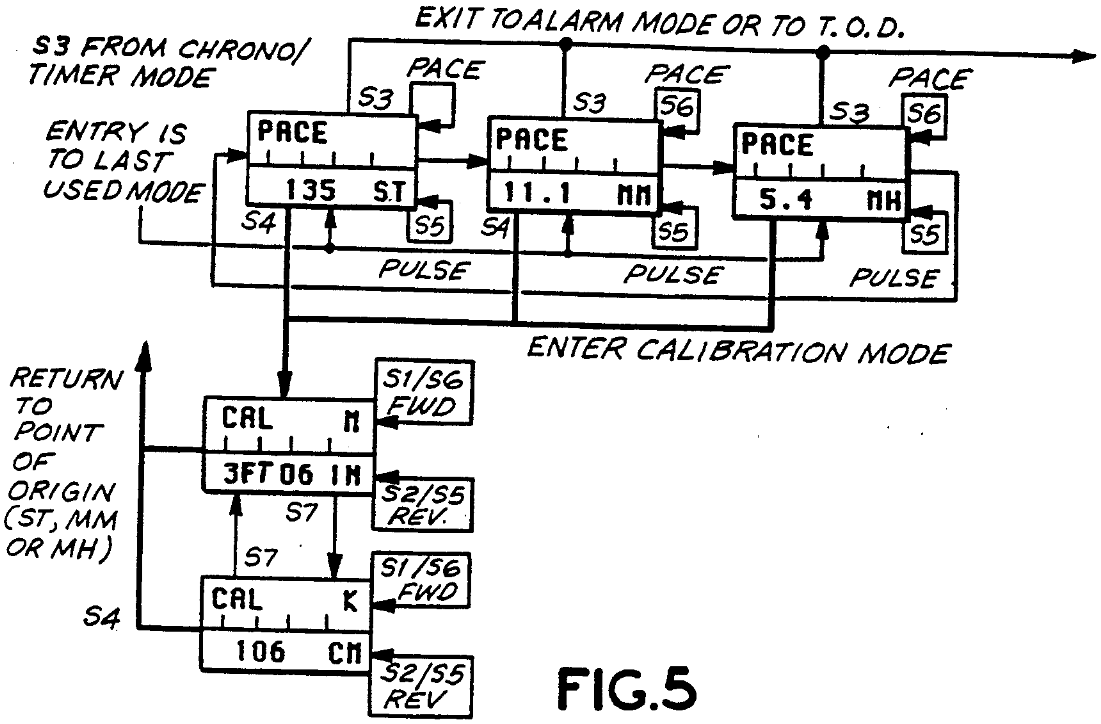
FIG. 5 is a detailed state diagram explaining operation of the pace display selection and stride calibration mode.
Figure 6:
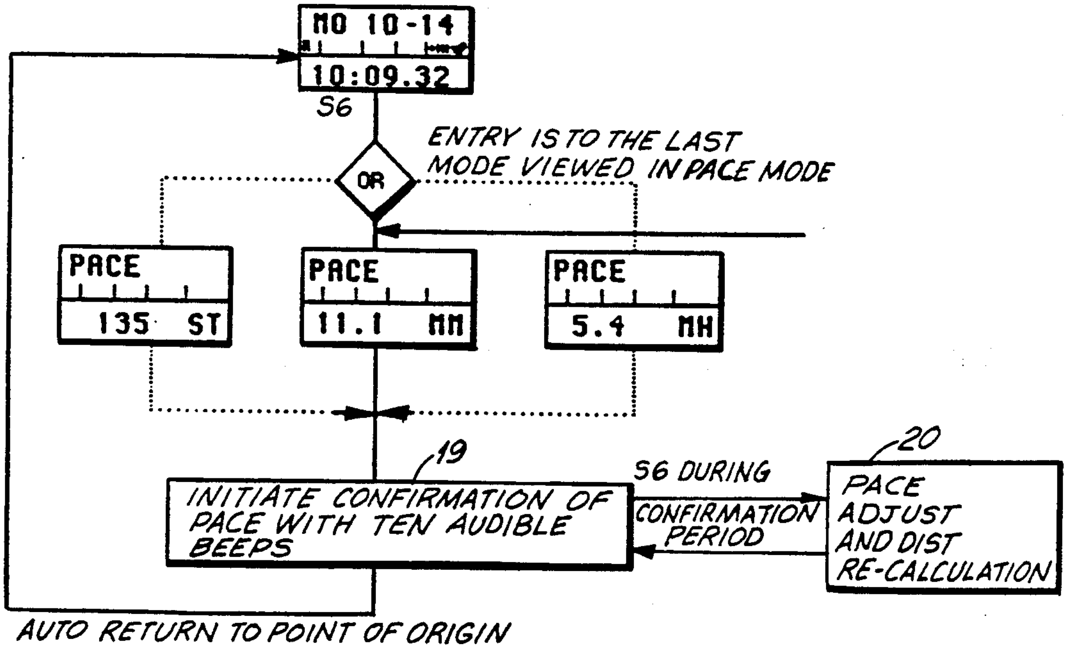
FIG. 6 is a gėneral state diagram showing audible pace confirmation and pace adjustment.

In FIGS. 4 through 6 of the drawing, "state" diagrams are shown for elapsed time mode, stride calibration mode and pace adjustment mode, respectively. One of the rectangles in each figure illustrates the type of display shown on the electroptic display 15 when the instrument is in that state. The other rectangles in the figure represent various states in which corrections or changes of displayed information may be controlled by the operator. The instrument continues to operate under control of the particular subroutine of the program in the microcomputer chip until the instrument is placed into another state. Manipulation of the electronic wristwatch to illuminate the display and carry out the various functions and capabilities is by selective actuation of the manually actuated switches S1-S7. The well known programming technique for determining whether the switches are opened or closed and taking appropriate action is through the operating system computer program stored in the microcomputer memory, in which each switch condition is tested during each complete interrogation cycle in a loop. If any switch is closed, the program branches to a subroutine which initiates a counter. The counter determines how long the switch has been closed or, if the watch has entered another "state" how long it has been in that "state".

FIG. 4 illustrates the detailed operation of the instrument while in the elapsed time mode. This mode enables the operator to display through the manual actuation of switches S1-S7, elapsed time as well as distance to be traveled. The latter is dependent on the particular set time and on the current set pace and stride length, and its setting is described below.

Specifically, the elapsed mode subroutine is designed to allow the operator to set the elapsed time in one minute increments to any predetermined length of time, not exceeding 23 hours, 59 minutes and 59 seconds. The operator may do so by actuating manual actuator, S4, which will place the timepiece in set mode, setting the desired elapsed time (Col. 7) by advancing the digits (actuator S1 or S6) or decrementing the digits (S2 or S5), and then reentering the elapsed time mode by pressing actuator S4 again. Entry from the timer set mode is shown in the upper left hand corner of FIG. 4.

FIG. 4 illustrates the operation of the elapsed time mode. Upon actuation of a manual switch S7, the elapsed time subroutine is programmed to begin a "countdown" starting from said predetermined length of time and continuing until reading 0 hours, 0 minutes and 0 seconds (which will be displayed on electroptic display 15 as "00:00.00"). Manual actuation of S7 a second time will stop the "countdown" sequence, and subsequent repeated actuation of S7 will ultimately start and stop this "countdown." When the timer is stopped during the "countdown" sequence, the operator may actuate actuator S2 one time to display last set time, or two times to display "Chrono/Timer" (FIG. 4), and the distance left to be traveled.

If the timer "countdown" sequence has been initiated and one half of the preset time has elapsed, the program is designed so that the display 15 will show "HALF WAY" (FIG. 4) and, if armed, an alarm consisting of three long beeps will sound to inform the operator that one half of the preset time has elapsed. This occurs irrespective of which mode the instrument is currently in. Thus even if the instrument is in a mode other than elapsed time mode, the "HALF WAY" display will appear automatically at the appropriate time. Should the operator at this point desire to alter the mode, he may do so by manual actuation of the appropriate switches as per Table 1.

If the "countdown" sequence is permitted to continue, when the time reaches zero a ten second alarm will sound and the electroptic display 15 will show "00:00.00", again irrespective of what mode the watch was in when "zero" time was reached. Manual actuation of any switch at this time will silence the alarm and will cause the last set time to be displayed. (The latter will also occur when the ten second alarm time has expired). If the instrument is in elapsed time mode, the operator has the option of actuating S2 to reset the time, or to restart the countdown by actuation of switch S7. If this is not done before the 10 sec alarm period has expired, however, the display will revert to the "Chrono/Timer" display.

If, instead, the instrument is in a mode other than elapsed time mode, the operator has four seconds in which to either: 1) Restart the elapsed time by actuation of switch S7; 2) reset the timer to read "Chrono/Timer" (FIG. 4) by actuation of switch S2; or 3) enter set mode by actuation of switch S4, enter a new countdown time, and then exit set mode and restart the new set time by manual actuation of switches S2 and S7, respectively. (In the latter case the four second limitation does not apply during set mode and therefore the four second period does not begin until exiting set mode.) If either no switches are actuated or the four second period has elapsed, the original set time will be displayed.

Reference to FIG. 4 also shows that at any time when the instrument is displaying elapsed time mode, the operator may instead display distance to be traveled, by manually actuating S1 which will also actuate the lamp. A second actuation of S1 will return the instrument to elapsed time display. Subsequent repeated actuation of S1 will cause the instrument to alternately display elapsed time and distance to be traveled modes.

Reference to FIG. 5 shows that the pace mode subroutine provides for three different pace mode displays: steps per minute ("ST"); minutes per mile ("MM"); and miles per hour ("MH"). Repeated manual actuation of S7 will cycle the pace mode through these three displays.

FIG. 5 also shows the basic operation of stride calibration mode. The stride calibration mode allows the operator to enter his own stride length which is, used in calculations performed by the program, particularly rate of travel in minutes per mile and miles per hour (FIG. 5), and distance to be traveled (FIG. 4). The integrated circuit program is designed to store in memory, certain constant conversion factors, including operator stride length in feet ("FT") and inches ("IN") or centimeters ("CM"), the number of feet and inches and centimeters in one mile and the number of minutes in one hour, which are necessary to the aforementioned calculations.

An example of a calculation using the operator's stride length is as follows: In order to calculate miles per hour, the program is designed to perform calculations which multiply stride length, currently stored pace (in steps per minute), and two conversion factors (mile/5280 feet and 60 minutes/1 hour). Thus if the operator's stride were 3 feet, 6 inches, and his pace were 135 steps per minute, the program would calculate the operator's rate of travel in miles per hour to be 5.4 (FIG. 5). (That is, 3.5 feet/step $\times$ 135 step/minute $\times$ 1 mile/5280 feet $\times$ 60 minutes/1 hour is equal to 5.4 when rounded off to the nearest tenths). Minutes per mile can be calculated by taking the inverse of the product of miles per hour and the conversion factor of 1 hour/60 minutes.

Distance to be traveled can be similarly calculated by multiplying the present elapsed time (FIG. 4) by the currently stored pace in steps per minute (FIG. 5), operator's stride length, and a conversion factor of 1 mile/5280 feet. Thus, for example, if elapsed time were 25 minutes (FIG. 4), currently stored pace were 135 steps per minute (FIG. 5), and length of operator stride were 3.5 feet per step, (FIG. 5), the program would calculate the distance to be traveled as 2.2372 miles (FIG. 4). (That is, 25 minutes $\times$ 135 steps/minute $\times$ 3.5 feet/- step×1 mile/5280 feet is equal to 2.2372 miles when rounded to the nearest ten-thousandths).

The operator may enter calibration mode by manually actuating S4 while in any of the three pace displays. The display will show calibration in feet and inches but the operator may instead display centimeters by actuating S7. Again the program is designed to store as a constant, the conversion factor of centimeters per mile. In either case, either S1 or S6 will advance the display forward, while either S2 or S5 will decrement the display. The operator may exit the calibration mode by actuating S4 again in which case the display will be returned to the original pace display.

Figure 7:
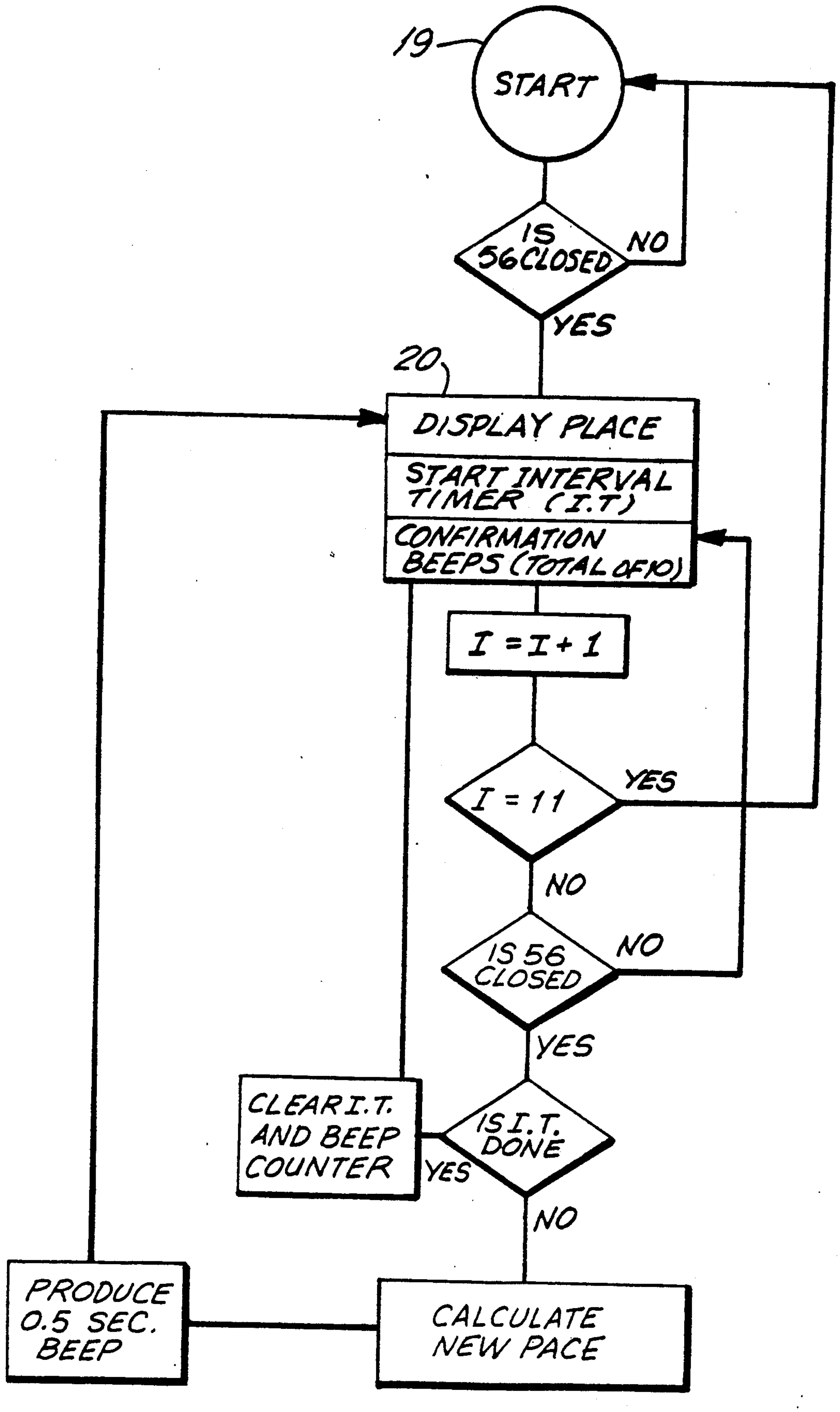
FIG. 7 is a detailed flow chart explaining operation of the audible pace confirmation and pace adjustment program.

Reference to FIGS. 6 and 7 illustrate the general operation of the pace confirmation and adjustment program which can be entered from any mode by manual actuation of S6. FIG. 6 shows that the actuation of S6 the first time will cause the last pace mode to be displayed. Thus, for example, if the operator viewed the pace mode in miles per hour, and had subsequently left pace mode to view other modes, he would upon manual actuation of S6 be returned to the miles per hour pace mode display. The pace confirmation and adjustment routine is illustrated generally by the blocks 19 and 20 of FIG. 6.

FIG. 7 is a flow chart explaining in more detail the operation of the pace confirmation and adjustment program. More specifically, it explains how the operator may readily synchronize the pace which is set in the instrument with his own natural pace.

As stated previously, the first actuation of S6 will cause to be displayed whatever pace mode was last viewed by the operator. At the moment this pace is displayed, an interval timer and incremental counter are started and a preselected number of audible confirmation beeps begins. The number of confirmation beeps is any convenient number, but ten beeps are used in the preferred embodiment. The confirmation beeps occur periodically at a rate equivalent to that preselected operator pace that is currently being stored in pace mode.

Thus if 60 steps per minute is currently stored in pace mode, the beeps will occur one every second (i.e., 60 steps/minute=1 step/second) for a total of ten beeps. Similarly, a pace display of 90 steps per minute will correspond to a rate of three audible beeps every two seconds (90 steps/minute=3 steps/2 seconds) for a total of ten beeps, i.e., having a frequency proportional to the preselected operator pace.

Once the pace adjustment mode has been initiated by the depression of S6, the operator must depress S6 a second time to calculate a new pace. Actuation of S6 operates a switch closure inside the timepiece which remains closed only for as long as S6 is depressed. In the disclosed invention the altered or new pace mode is determined by the time elapsed between the opening of the switch closure after the first depression or actuation of S6 and the closing of this switch closure upon the second depression or actuation of S6.

It is understood that it is well within the scope of the invention, however, for the program to be designed so that the new or altered pace mode is determined during one depression of S6; wherein first and second actuation of S6 respectively comprise the depression and release of S6 by the operator. This depression and release in turn correspond respectively to the closing and opening of the switch closure during this one depression. The time elapsed between the closing and opening of the switch closure during this one depression determines the new or altered pace mode.

The time elapsed between first and second actuation is determined by the operator of the timepiece. The first actuation when the operator's foot hits the ground commences a timing event. The second actuation when the operator's foot hits the ground again terminates the timing event. The program alters the previous preselected pace to calculate a new or altered pace and stores it in memory in place of the previous preselected pace.

As FIG. 7 shows, in order to set a new pace, the second actuation of S6 must occur before the incremental counter has reached a count of 11 (FIG. 7) and the audible device has sounded a total of 10 confirmation beeps. If S6 is not actuated before the incremental counter has reached 11 or before 10 confirmation beeps, the display is returned to that mode which was displayed before the first actuation of S6.

Additionally, the second actuation of S6 must also occur before four seconds have elapsed since the starting of interval timer. The function of the interval timer is to reduce the time that the integrated circuit must wait for a second input, and thus serves to determine when the chip need no longer wait for a second actuation of S6. Therefore, as FIG. 7 shows, the program will check the status of the interval timer, and if S6 is actuated a second time before the ten confirmation beeps, but after 4 seconds have elapsed since the interval timer was first started, then the interval timer is restarted and incremental "beep counter" reset, but no new pace is calculated.

If the user actuates S6 a second time before the ten confirmation beeps and before 4 seconds have elapsed, a new pace is calculated as described above, and the display is updated to show the new pace. Additionally, a 0.5 second beep sounds to indicate that a new pace has been calculated. Once this new pace has been calculated, a new set of confirmation beeps is produced by the alarm.

Finally, at any time after the confirmation mode has been started, it can be cancelled by the actuation of any switch except S1 and S6.

The programming steps necessary to carry out the flow chart steps illustrated in FIG. 7, so as to alter and store a previously selected pace and to subsequently perform calculations using this altered pace as previously described are well within the scope of those skilled in the programming art, and are readily incorporated into the operating program of the integrated circuit.

The term "state" and "mode" are used interchangeably herein and are not intended by way of limitation.

While there has been described what is considered to be the preferred embodiment of the invention, other modifications will become known to those skilled in the art and it is desired to cover, in the appended claims, all such modifications as fall within the true spirit and scope of the invention.

I claim:

1. Improvement in a multimode electronic timepiece having an electroptic display, an audible device, a plurality of manually actuated actuators and a mask programmable integrated circuit programmed to keep time and to provide a plurality of timepiece operating modes including a pace mode, wherein said integrated circuit is programmed to permit an operator to switch between modes in response to actuation of at least a first of said actuators; said integrated circuit being further programmed to accept and store information in memory in response to actuation of at least a second of said actuators, to perform calculations thereon and to display said information and results of said calculations on said elec display; said integrated circuit being further programmed to provide, upon actuation of at least a third of said actuators, audible periodic electronic sounds produced by said audible device, wherein the frequency of said sounds varies proportionately to the value of a preselected pace of said operator, and wherein said improvement comprises:

means responsive to first manual actuation of a selected actuator coinciding with one footfall of the operator to commence a timing event;

means responsive to second manual actuation of said selected actuator coinciding with a later footfall of the operator to terminate said timing event;

program means to alter said preselected pace and store an altered pace which is inversely proportional to the time elapsed between first and second actuation of said selected actuator; and, means for displaying said altered pace and causing said audible device to sound at a rate equivalent to said altered pace.

2. The improvement according to claim 1, wherein at least said selected actuator is a pushbutton which operates switch closures inside said timepiece, wherein said switch closures are closed only for so long as said pushbutton is depressed.

3. The improvement according to claim 2, wherein said elapsed time comprises the time between the opening of said switch closure after first actuation of said selected actuator and the closing of said switch closure upon said second actuation of said selected actuator.

4. The improvement according to claim 2, wherein said first and second actuation of said selected actuator respectively comprise the manual depression and release of said selected actuator by said operator, wherein said depression and release of said selected actuator respectively correspond to the closing and opening of said switch closure, and wherein said elapsed time comprises the time between said opening and closing of said switch closure.

5. The improvement according to claim 1, wherein said program means include an interval timer and incremental counter.

6. The improvement according to claim 5, wherein said program means are adapted to cause said audible device to produce a preselected number of sounds at a rate which varies proportionately to the pace value which is being currently stored in said pace mode.

7. The improvement according to claim 5, wherein said program means are adapted to provide for the return from a currently displayed mode to the mode last displayed before actuation of said selected actuator, if said selected actuator is not actuated within a predetermined count on said incremental counter.

8. The improvement according to claim 5, wherein said program means are adapted to provide for the checking of the status of said interval timer, and the resetting of said incremental counter and restarting of said interval timer if the difference in time between first and second actuation of said selected actuator exceeds a predetermined time to which said interval timer is set.

9. The improvement according to claim 1, wherein said integrated circuit is programmed to perform calculations and to display in said pace mode, a plurality of states selected from the group consisting of: steps per minute; minutes per mile; and miles per hour.

10. The improvement according to claim 9, wherein said integrated circuit is programmed to allow said operator, while in said pace mode, to cycle said timepiece through said plurality of states in a preselected manner through repeated manual actuation of one of said actuators.

11. The improvement according to claim 1, wherein said integrated circuit is programmed to provide for a calibration mode having means for storing an operator stride length, to display said value in response to actuation of one of said actuators and, whereby said operator may alter the value of said length of operator stride through the actuation of one of said plurality of said actuators.

12. The improvement according to claim 11, wherein said integrated circuit is programmed to allow said operator to alternately display said length of operator stride in feet and inches or centimeters through the actuation of one of said actuators.

13. The improvement according to claim 1, wherein said integrated circuit is programmed to provide for an elapsed time mode, and to count down from a preselected time to continuously compute an elapsed time.

14. The improvement according to claim 13, wherein said integrated circuit is programmed to store an operator stride length and to perform calculations to compute a distance to be traveled based on said elapsed time and said stride length.

15. The improvement according to claim 14, wherein said integrated circuit is programmed to allow an operator to alternately display said elapsed time and said distance to be traveled through the repeated actuation of one of said actuators.

16. The improvement according to claim 13, wherein said integrated circuit is programmed to automatically place said timepiece in said elapsed time mode at preselected times after said elapsed time mode has been initiated.

17. The improvement according to claim 16, wherein said timepiece is placed in said elapsed time mode at a time that is one half of said preselected time to which said operator has set said elapsed time mode and wherein said electroptic display includes an indicia representing half of the distance to be traveled, and having means to actuate said indicia.

* * * * *